(12) United States Patent
Maldonado et al.

(10) Patent No.: US 12,324,446 B2
(45) Date of Patent: *Jun. 10, 2025

(54) DAIRY-BASED MEAT SUBSTITUTE AND METHODS OF PRODUCING THE SAME

(71) Applicant: LAND O'LAKES, INC., Arden Hills, MN (US)

(72) Inventors: Orlando Maldonado, Minneapolis, MN (US); Molly Erickson, Roseville, MN (US); Susan Reed, North Oaks, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/327,586

(22) Filed: Jun. 1, 2023

(65) Prior Publication Data

US 2023/0301327 A1 Sep. 28, 2023

Related U.S. Application Data

(63) Continuation of application No. 16/235,010, filed on Dec. 28, 2018, now Pat. No. 11,700,865.

(60) Provisional application No. 62/632,182, filed on Feb. 19, 2018.

(51) Int. Cl.
| | |
|---|---|
| *A23J 3/22* | (2006.01) |
| *A23J 3/08* | (2006.01) |
| *A23L 27/21* | (2016.01) |
| *A23L 27/26* | (2016.01) |
| *A23L 33/125* | (2016.01) |

(52) U.S. Cl.
CPC .............. *A23J 3/227* (2013.01); *A23J 3/08* (2013.01); *A23L 27/215* (2016.08); *A23L 27/26* (2016.08); *A23L 33/125* (2016.08); *A23V 2002/00* (2013.01)

(58) Field of Classification Search
CPC .......... A23J 3/227; A23L 27/26; A23L 27/215
See application file for complete search history.

(56) References Cited

U.S. PATENT DOCUMENTS

| | | |
|---|---|---|
| 4,001,437 A | 1/1977 | Jaeggi et al. |
| 4,132,809 A | 1/1979 | Desrosier |
| 4,341,801 A | 7/1982 | Weissman |
| 4,430,356 A | 2/1984 | Ohyabu et al. |
| 4,537,788 A | 8/1985 | Proctor et al. |
| 4,810,307 A | 3/1989 | Caton |
| 6,815,000 B2 | 11/2004 | Kesler |
| 7,597,921 B2 | 10/2009 | Walsh et al. |
| 7,998,518 B2 | 8/2011 | Kweldam |
| 2005/0008760 A1 | 1/2005 | Kesler |
| 2008/0254168 A1 | 10/2008 | Mueller et al. |
| 2008/0268112 A1 | 10/2008 | Rolan et al. |
| 2009/0142457 A1 | 6/2009 | Redin et al. |
| 2009/0208612 A1 | 8/2009 | Reiser et al. |
| 2010/0074998 A1 | 3/2010 | Espeleta et al. |
| 2016/0066612 A1 | 3/2016 | Mou et al. |
| 2017/0105438 A1 | 4/2017 | Ajami et al. |
| 2019/0254309 A1 | 8/2019 | Maldonado et al. |

FOREIGN PATENT DOCUMENTS

| | | |
|---|---|---|
| CN | 1826969 B | 10/2011 |
| CN | 102551020 B | 12/2013 |
| CN | 103564353 B | 3/2015 |
| CN | 103704463 B | 4/2016 |
| CN | 105454446 A | 4/2016 |
| CN | 105455182 A | 4/2016 |
| CN | 104323224 B | 7/2016 |
| CN | 105725179 A | 7/2016 |
| CN | 107006612 A | 8/2017 |
| CN | 105053980 B | 10/2017 |
| CN | 104855526 B | 2/2018 |
| EP | 2374363 A1 | 10/2011 |
| EP | 1965657 B1 | 4/2014 |
| WO | 2007054756 A2 | 5/2007 |
| WO | 2017077189 A1 | 5/2017 |

OTHER PUBLICATIONS

International Preliminary Report on Patentability received for International Application No. PCT/US2019/018266 mailed on Sep. 3, 2020, 7 pages.
Berry, D, "New Food Solutions from Extrusion", Prepared Foods; vol. 169, Issue 7, Nov. 23, 2000, pp. 67-72.
Nunez, Felix, et al., "Production of Secondary Metabolites by Some Terverticillate Penicillia on Carbohydrate-Rich and Meat Substrates", Journal of Food Protection; vol. 70, Issue 12, Dec. 2007, pp. 2829-2836.
PCT, "International Search Report and Written Opinion", Application No. PCT/US2019/018266, Apr. 16, 2019, 8 pages.
Time Magazine, Kloberdanz, Kristen , "Step Aside, Slim Jim", Nov. 17, 2003, pp. 150.
Vegetarian Journal, "Veggie Bits", vol. 22, Issue 2, 2003, pp. 9.
Vegetarian Journal, "Veggie Bits", vol. XXVIII, Issue 2, 2009, pp. 30.

(Continued)

*Primary Examiner* — Jeffrey P Mornhinweg
(74) *Attorney, Agent, or Firm* — Dorsey & Whitney LLP

(57) ABSTRACT

Meat substitutes include at least a dried milk product, a carbohydrate, and a liquid such as water. The dried milk product includes one or both of non-fat dry milk and buttermilk powder. The carbohydrate includes one or both of syrup solids, such as corn syrup solids, and a starch, such as modified corn starch. The meat substitutes include amino acids and sugars that undergo a Maillard reaction during preparation of the meat substitutes, yielding flavor compounds in, and non-enzymatic browning of, the meat substitutes. The meat substitutes can be used in the production of food products such as dairy-based jerky.

15 Claims, 3 Drawing Sheets

(56) References Cited

OTHER PUBLICATIONS

Vegetarian Journal, "Veggie Bits", vol. 35. Issue 3, 2016, pp. 29.
Wang, Xue-Bo, "Study on the Technology of How to Use Chanterelle to Imitate Beef Jerky", School of Applied Chemical Engineering of Xichang College, pp. 67-69.
Zhang, Bojin, et al., "Study on production process of Lentinus edodes vegetarian jerky", Storage and Process; vol. 13, Issue 6, Jan. 2, 2014, pp. 29-31.

DAIRY-BASED MEAT SUBSTITUTE AND METHODS OF PRODUCING THE SAME

CROSS REFERENCE TO RELATED APPLICATIONS

This application is a continuation of U.S. application Ser. No. 16/235,010, filed Dec. 28, 2018, issued as U.S. Pat. No. 11,700,865, on Jul. 18, 2023, entitled "DAIRY-BASED MEAT SUBSTITUTE AND METHODS OF PRODUCING THE SAME," which claims the benefit of priority under 35 U.S.C. § 119 to U.S. Provisional Patent Application No. 62/632,182 filed Feb. 19, 2018, entitled "DAIRY-BASED MEAT SUBSTITUTE AND METHODS OF PRODUCING THE SAME," the entireties of which are hereby incorporated by reference for all purposes.

TECHNICAL FIELD

The present disclosure relates generally to dairy-based meat substitutes and methods of producing the same.

BACKGROUND

Consumer demand for foods containing proteins has increased over the past few decades as the benefits of proteins, including providing satiety and building muscle mass, have been promoted by the medical community and in the popular press. Vegetarian diets in general, and vegetarian sources of protein in particular, have increased in popularity as consumer interest in healthier eating habits has grown. Meat substitutes have also increased in popularity as consumers desire to continue making familiar, traditional, or favorite meals without meat or with less meat. Many known meat substitutes include plant-derived proteins, such as from soy beans.

Meat substitutes may mimic natural or processed meat products in any one or more of appearance, odor, flavor, texture, nutrient profile, and response to heating. Meat substitutes are available alone or incorporated into prepared or processed foods. Consumers desire healthy, convenient snack foods with protein that is not derived from animal muscle.

SUMMARY

Some implementations provide methods of producing a meat substitute. In embodiments, a method of producing a meat substitute includes blending water with a mixture of at least one dried milk product comprising lactose and protein and at least one carbohydrate to form a gel. The gel is spread to form a layer such that the gel has a thickness of about 1 mm to about 10 mm. The gel layer is heated in a first heating step performed at about 210° F. to about 320° F. for about 30 minutes to about 50 minutes. The gel is heated in a second heating step having a different temperature than the first heating step. Lactose and protein in the at least one dried milk product undergo a Maillard reaction in the second heating step to form the meat substitute. The meat substitute includes a protein content of about 13 weight percent to about 21 weight percent and a fat content of about 1.25 weight percent to about 2.0 weight percent.

In embodiments, the Maillard reaction occurs by heating the gel to a temperature of about 300° F. to about 450° F. for about 15 minutes to about 25 minutes.

In embodiments, the Maillard reaction occurs by frying the gel at a temperature of about 275° F. to about 450° F. for about 3 minutes to about 7 minutes.

In embodiments, the at least one dried milk product is selected from non-fat dry milk and buttermilk powder. The at least one dried milk product may be present at about 35 weight percent to about 60 weight percent of the meat substitute.

In embodiments, the at least one carbohydrate is selected from corn syrup solids and corn starch.

In embodiments, the gel is free of a protein isolate, which may be a whey isolate.

In embodiments, methods of producing a meat substitute include marinating the meat substitute and removing moisture from the marinated meat substitute to about 12 weight percent to about 18 weight percent moisture. The moisture may be removed from the marinated meat substitute by a third heating step comprising heating the marinated meat substitute at about 140° F. to about 220° F. for about 4.75 hours to about 7.25 hours.

In embodiments, a method of producing a meat substitute includes forming a gel comprising water, corn syrup solids, corn starch, and one or more of non-fat dry milk and buttermilk powder. The gel is heated in a first heating step performed at about 210° F. to about 320° F. for about 30 minutes to about 50 minutes. The gel is heated in a second heating step having a different temperature than the first heating step. Lactose and protein in the at least one dried milk product undergo a Maillard reaction in the second heating step to form the meat substitute. The meat substitute includes a protein content of about 13 weight percent to about 21 weight percent and a fat content of about 1.25 weight percent to about 2.0 weight percent.

In embodiments, the Maillard reaction occurs by heating the gel to a temperature of about 300° F. to about 450° F. for about 15 minutes to about 25 minutes.

In embodiments, the Maillard reaction occurs by frying the gel at a temperature of about 275° F. to about 450° F. for about 3 minutes to about 7 minutes.

In embodiments, the at least one dried milk product is selected from non-fat dry milk and buttermilk powder. The at least one dried milk product may be present at about 35 weight percent to about 60 weight percent of the meat substitute.

In embodiments, the gel is free of a protein isolate, which may be a whey isolate.

In embodiments, prior to forming the gel, corn syrup solids, corn starch, and one or more of non-fat dry milk and buttermilk powder are a mixture of dry ingredients.

In embodiments, prior the first heating step, the gel is poured to form a layer such that the gel has a thickness of about 1 mm to about 10 mm.

In embodiments, methods of producing a meat substitute include marinating the meat substitute and removing moisture from the marinated meat substitute to about 12 weight percent to about 18 weight percent moisture. The moisture may be removed from the marinated meat substitute by a third heating step comprising heating the marinated meat substitute at about 140° F. to about 220° F. for about 4.75 hours to about 7.25 hours.

DETAILED DESCRIPTION

Figure 1:
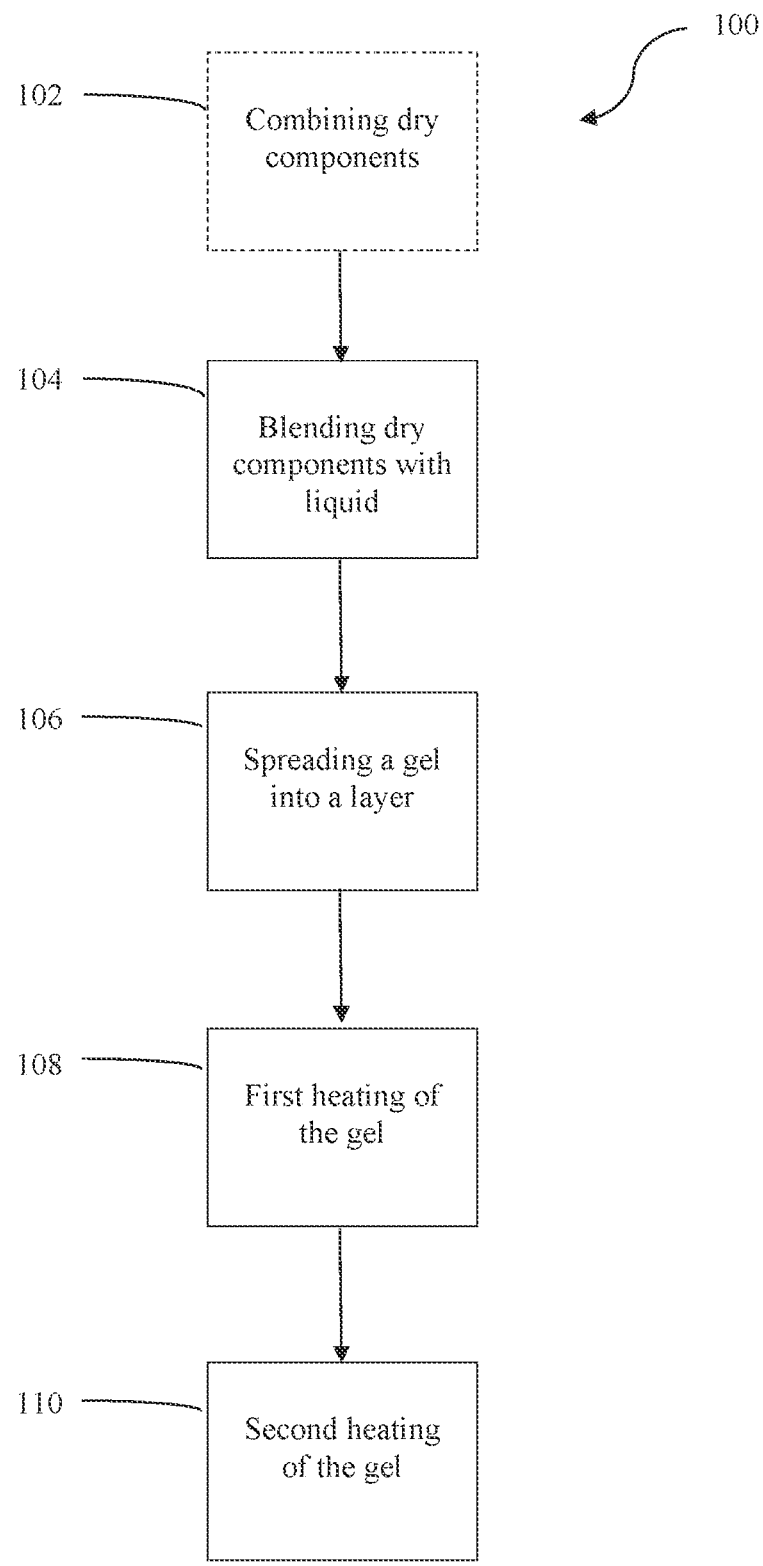
FIG. 1 is a flow diagram of a meat substitute preparation method according to one embodiment.

Edible meat substitutes, or protein snacks, including dairy-based components are disclosed herein. The meat substitutes do not include meat and may be described as vegetarian. The meat substitutes may have the appearance, aroma, taste, and/or texture of a natural meat or meat-based food product, such as meat jerky.

Meat Substitute Formulations

A meat substitute may be generally understood as a composition including at least one dried milk product and a plurality of additional components. The composition may additionally include a liquid and one or more carbohydrates, gelling agents, or texturizers. Any given component may serve more than one function.

Dried milk products may be milk or any component thereof that has been fully or partially dried. Examples of dried milk products include non-fat dry milk, buttermilk powder, whey protein concentrate, milk protein concentrate, micellar casein concentrate, native whey protein concentrate, and native whey isolate. While both native whey protein (also known as "serum protein" or "milk-derived whey") and whey protein (also known as "traditional whey protein") are derived from milk, a native whey protein differs from a whey protein in that the former is produced directly from milk through microfiltration, and the latter is a co-product of cheese-make. Each has a different functionality and each may perform differently in a meat substitute. In one embodiment, meat substitutes include one or both of non-fat dry milk and buttermilk powder. Non-fat dry milk may include about 30 weight percent to about 40 weight percent total protein, of which whey is about 20 weight percent and casein is about 80 weight percent. Non-fat dry milk may include about 45 weight percent to about 55 weight percent lactose, about 3 weight percent to about 5 weight percent moisture, about 7 weight percent to about 10 weight percent ash (minerals), and less than 1 weight percent fat. Buttermilk powder may include about 30 weight percent to about 40 weight percent protein, of which whey is about 20 weight percent and casein is about 80 weight percent. Buttermilk powder may include about 45 weight percent to about 55 weight percent lactose, about 4 weight percent to about 7 weight percent fat, about 3 weight percent to about 5 weight percent moisture, and about 7 weight percent to about 10 weight percent ash.

The dried milk products may be present at about 35 weight percent to about 75 weight percent of a meat substitute, about 35 weight percent to about 70 weight percent, about 35 weight percent to about 65 weight percent, about 35 weight percent to about 60 weight percent, about 35 weight percent to about 55 weight percent, about 35 weight percent to about 50 weight percent, about 35 weight percent to about 45 weight percent, about 35 weight percent to about 40 weight percent, about 40 weight percent to about 75 weight percent, about 45 weight percent to about 75 weight percent, about 50 weight percent to about 75 weight percent, about 55 weight percent to about 75 weight percent, about 60 weight percent to about 75 weight percent, about 65 weight percent to about 75 weight percent, about 45 weight percent to about 55 weight percent, or about 47 weight percent to about 53 weight percent of the meat substitute.

The non-fat dry milk may be present at about 30 weight percent to about 52 weight percent of a meat substitute, about 30 weight percent to about 48 weight percent, about 30 weight percent to about 44 weight percent, about 30 weight percent to about 40 weight percent, about 30 weight percent to about 36 weight percent, about 34 weight percent to about 52 weight percent, about 38 weight percent to about 52 weight percent, about 42 weight percent to about 52 weight percent, about 46 weight percent to about 52 weight percent, about 35 weight percent to about 45 weight percent, or about 38 weight percent to about 43 weight percent of the meat substitute.

The buttermilk powder may be present at about 7 weight percent to about 12 weight percent of a meat substitute, about 7 weight percent to about 11 weight percent, about 7 weight percent to about 10 weight percent, about 7 weight percent to about 9 weight percent, about 8 weight percent to about 12 weight percent, about 9 weight percent to about 12 weight percent, about 10 weight percent to about 12 weight percent, about 8 weight percent to about 11 weight percent, or about 9 weight percent to about 10 weight percent of the meat substitute.

In the implementations and use of a meat substitute, dried milk products may help produce a composition having a source of protein that is not derived from animal muscle. Dried milk products may add bulk to the meat substitute. The use of dried, as compared to liquid, milk products, may be more convenient, including in methods of preparing meat substitutes described below. In the implementations and use of a meat substitute, buttermilk powder in general, or the fat in buttermilk powder in particular, may help produce a composition that mimics the mouthfeel or texture of meat products, such as meat jerky.

The meat substitute may have a higher lactose content, such as from inclusion of a dried milk product, than known meat substitutes. The lactose may provide a source of sugar for a Maillard reaction, which reaction may produce flavor compounds in the meat substitute and/or may promote non-enzymatic browning of the substitute. The Maillard reaction is described in more detail in connection with methods of making the meat substitutes.

The carbohydrates may be any sugar or starch. In one embodiment, meat substitutes include one or both of glucose solids and starch. The glucose solids may be syrup solids such as corn syrup solids. The syrup solids may have a dextrose equivalent (DE) of about 5 to about 55, about 5 to about 45, about 5 to about 35, about 5 to about 25, about 5 to about 15, about 15 to about 55, about 25 to about 55, about 35 to about 55, or about 45 to about 55. In some embodiments, the syrup solids are corn syrup solids that may have a DE of about 26 or greater, such as about 26 to about 30, or about 28.

The starch may be corn starch, which may be modified corn starch, such as a cold swelling corn starch.

The gelling agents or texturizers may be locust bean gum, carrageenan, conjac gum, starch, and/or mixtures thereof.

The carbohydrates, gelling agents, or texturizers may not be included (about 0 weight percent) or may be present at about 26 weight percent to about 70 weight percent of a meat substitute, about 26 weight percent to about 65 weight percent, about 26 weight percent to about 60 weight percent, about 26 weight percent to about 55 weight percent, about 26 weight percent to about 50 weight percent, about 26 weight percent to about 45 weight percent, about 26 weight percent to about 40 weight percent, about 26 weight percent to about 35 weight percent, about 30 weight percent to about 70 weight percent, about 35 weight percent to about 70 weight percent, about 40 weight percent to about 70 weight percent, about 45 weight percent to about 70 weight percent, about 50 weight percent to about 70 weight percent, about 55 weight percent to about 70 weight percent, about 60 weight percent to about 70 weight percent, about 40 weight percent to about 60 weight percent, about 32 weight percent to about 35 weight percent, or about 33 weight percent to about 34 weight percent of the meat substitute.

The glucose solids may be present at about 6 weight percent to about 10 weight percent of a meat substitute, about 6 weight percent to about 10 weight percent, about 6 weight percent to about 9 weight percent, about 6 weight percent to about 8 weight percent, about 6 weight percent to about 7 weight percent, about 7 weight percent to about 10 weight percent, about 8 weight percent to about 10 weight percent, about 9 weight percent to about 10 weight percent, about 7 weight percent to about 9 weight percent, or about 7.5 weight percent to about 8 weight percent of the meat substitute.

The starch may not be included (0 weight percent) or may be present at up to 32 weight percent of a meat substitute, such as about 20 weight percent to about 32 weight percent of a meat substitute, about 20 weight percent to about 30 weight percent, about 20 weight percent to about 28 weight percent, about 20 weight percent to about 26 weight percent, about 20 weight percent to about 24 weight percent, about 22 weight percent to about 32 weight percent, about 24 weight percent to about 32 weight percent, about 26 weight percent to about 32 weight percent, about 28 weight percent to about 32 weight percent, about 25 weight percent to about 27 weight percent, or about 25.5 weight percent to about 26 weight percent of the meat substitute.

In the implementations and use of a meat substitute, syrup solids, which may be corn syrup solids, may help impart a desired texture, sweetness, and/or level of crystallization to the meat substitute. Syrup solids may help impact a desired texture by providing bulk texture to the meat substitute. Without being limited to any mechanism or mode of action, the syrup solids may act as a humectant and thereby allow the meat substitute to retain a desired texture for a longer period of time than in the absence of syrup solids. In the implementations and use of a meat substitute, the syrup solids may help increase moisture retention or control over time, reduce or prevent hardening of the substitute over time, and/or extend the shelf life of the substitute. Employing syrup solids with lower dextrose equivalents (e.g., about 26 to about 30) may help a meat substitute to maintain a chewier texture over time. Employing syrup solids with higher dextrose equivalents (e.g., about 42 or greater) may help produce a meat substitute with a more organized crystal structure and a crisper texture than using syrup solids with lower dextrose equivalents. In the implementations and use of a meat substitute, syrup solids may provide a source of sugar for a Maillard reaction, which may produce flavor compounds in the meat substitute and/or may promote non-enzymatic browning of the substitute, which may improve appearance of the meat substitute.

In the implementations and use of a meat substitute, starch may help thicken the substitute, such as by thickening a liquid or gel precursor to the substitute. A cold swelling corn starch may swell quickly or almost instantly at ambient temperature and may help quickly thicken a liquid or gel precursor to the substitute. In the implementations and use of a meat substitute, starch may help build texture.

In some embodiments, meat substitutes include one or more flavoring agents. Flavoring agents may be any substance that helps a meat substitute achieve a desired taste. For example, flavoring agents may impart a savory taste. Examples of flavoring agents include herbs, spices, salt, and inclusions. Flavoring agents may be in the form of, for example, topically applied powders, rubs, or inclusions. Inclusions may be, for example, seeds, nuts, or dried fruits.

Flavoring agents may not be included (0 weight percent) in a meat substitute, or may be present at about 3 weight percent to about 10 weight percent, about 3 weight percent to about 9 weight percent, about 3 weight percent to about 8 weight percent, about 3 weight percent to about 7 weight percent, about 3 weight percent to about 6 weight percent, about 3 weight percent to about 5 weight percent, about 3 weight percent to about 4 weight percent, about 4 weight percent to about 10 weight percent, about 5 weight percent to about 10 weight percent, about 6 weight percent to about 10 weight percent, about 7 weight percent to about 10 weight percent, or about 4 weight percent to about 5 weight percent of the meat substitute.

In some embodiments, meat substitutes include one or more coloring agents. Coloring agents may be any substance that helps produce a meat substitute with a desirable or appealing color. One example of a coloring agent is caramel color, which may be in liquid or solid form.

Coloring agents may not be included (0 weight percent) in a meat substitute, or may be present at about 0.1 weight percent to about 3 weight percent, about 0.1 weight percent to about 2.5 weight percent, about 0.1 weight percent to about 2 weight percent, about 0.1 weight percent to about 1.5 weight percent, about 0.1 weight percent to about 1 weight percent, about 0.5 weight percent to about 3 weight percent, about 1 weight percent to about 3 weight percent, about 1.5 weight percent to about 3 weight percent, or about 2 weight percent to about 3 weight percent of a meat substitute.

In some embodiments, meat substitutes include one or more powders capable of reducing stickiness of a meat substitute. One example of a powder is maltodextrin. A powder may be applied by dusting it onto the meat substitute.

One or more liquids may be present at about 5 weight percent to about 32 weight percent of a meat substitute, about 5 weight percent to about 28 weight percent, about 5 weight percent to about 24 weight percent, about 5 weight percent to about 20 weight percent, about 5 weight percent to about 16 weight percent, about 10 weight percent to about 32 weight percent, about 15 weight percent to about 32 weight percent, about 20 weight percent to about 32 weight percent, about 25 weight percent to about 32 weight percent, about 20 weight percent to about 27 weight percent, or about 20.5 weight percent to about 26.5 weight percent of the meat substitute.

The liquid may be any edible liquid such as water, milk, or filtered milk.

The meat substitute may exclude one or more components of known meat substitutes. For example, the meat substitute may not include a protein isolate such as a whey isolate. A whey isolate may include a higher amount of whey protein than does a dried milk product. For example, a whey isolate may include about 90 weight percent whey protein and a non-fat dry milk may include about 6 weight percent to about 7 weight percent whey protein. A whey isolate may include a lower amount of casein than does a dried milk product. For example, a whey isolate may include less than about 10 weight percent casein and a non-fat dry milk may include about 24 weight percent to about 29 weight percent casein. A whey isolate may include a lower amount of lactose than does a dried milk product. For example, a whey isolate may include less than about 5 weight percent lactose and a non-fat dry milk may include about 50 weight percent to about 60 weight percent lactose.

The meat substitute may not include any one or more of a whey additive and a plant-derived protein. Examples of plant-derived proteins include proteins from canola, cottonseed, soy, sunflower, and wheat. The meat substitute may not include any components derived from animal muscle. In other words, the meat substitute may be a meatless or vegetarian product.

Meat substitute formulations include proteins, fats, moisture, and other components. Meat substitutes may have a protein content of about 5 weight percent to about 30 weight percent of a meat substitute, or about 5 weight percent to about 25 weight percent, about 5 weight percent to about 20 weight percent, about 5 weight percent to about 15 weight percent, about 10 weight percent to about 30 weight percent, about 15 weight percent to about 30 weight percent, about 20 weight percent to about 30 weight percent, or about 15 to about 20 weight percent of the meat substitute. In some embodiments, the meat substitute includes low amounts of or no carbohydrates and the protein content the meat substitute is higher than in meat substitutes that include higher amounts of carbohydrates. In one example, a meat substitute includes carbohydrates and has a protein content of about 13 weight percent to about 21 weight percent of the meat substitute.

The fat content of the meat substitutes may be up to about 2.0 weight percent of a meat substitute. The meat substitute may not include fat (about 0 weight percent) or may include about 0.5 weight percent to about 2.0 weight percent of a meat substitute, or about 0.5 weight percent to about 1.75 weight percent, about 0.5 weight percent to about 1.5 weight percent, about 0.5 weight percent to about 1.25 weight percent, about 0.5 weight percent to about 1.0 weight percent, about 0.75 weight percent to about 2.0 weight percent, about 1.0 weight percent to about 2.0 weight percent, about 1.25 weight percent to about 2.0 weight percent, about 1.5 weight percent to about 2.0 weight percent, about 1.75 weight percent to about 2.0 weight percent, about 1.5 weight percent to about 1.7 weight percent, or about 1.6 weight percent of the meat substitute.

The moisture content of the meat substitute may be about 16 weight percent to about 32 weight percent of a meat substitute, about 16 weight percent to about 28 weight percent, about 16 weight percent to about 24 weight percent, about 16 weight percent to about 20 weight percent, about 20 weight percent to about 32 weight percent, about 24 weight percent to about 32 weight percent, about 38 weight percent to about 32 weight percent, about 20 weight percent to about 27 weight percent, or about 20.5 weight percent to about 26.5 weight percent of the meat substitute.

In some embodiments, meat substitutes may be used to prepare a food product such as a dairy-based jerky. In addition to the meat substitute, a dairy-based jerky may include one or more flavoring agents and/or one or more coloring agents. The meat substitute may have a neutral flavor in the absence of a flavoring agent. The meat substitute may have a neutral color in the absence of a coloring agent. The meat substitute may be amenable to picking up flavors of flavoring agents and/or colors of coloring agents.

Flavoring agents may be any substance that helps a dairy-based jerky achieve a desired taste. For example, flavoring agents may impart a savory taste. Examples of flavoring agents include herbs, spices, oil, salt, and sugar. Examples of flavoring agents suitable for dairy-based jerky include garlic, ginger, onion, salt, sesame (such as sesame seeds or sesame oil), soy (such as soybeans, soybean oil, or soy sauce), and sugar. One or more flavoring agents may impart a taste such as barbeque, mango chipotle, maple-bacon, and teriyaki.

The amount of flavoring agents present may be at about 3 weight percent to about 7 weight percent of a dairy-based jerky, about 3 weight percent to about 6 weight percent, about 3 weight percent to about 5 weight percent, about 3 weight percent to about 4 weight percent, about 4 weight percent to about 7 weight percent, about 5 weight percent to about 7 weight percent, about 6 weight percent to about 7 weight percent, about 3.5 weight percent to about 6 weight percent, or about 4 weight percent to about 5.5 weight percent of the dairy-based jerky.

Coloring agents may be any substance that helps produce a dairy-based jerky with a desirable or appealing color. One example of a coloring agent is a spice.

Coloring agents may not be included (0 weight percent) in a dairy-based jerky, or may be present at less than about 1 weight percent, less than about 0.5 weight percent, or less than about 0.01 weight percent of a dairy-based jerky.

Dairy-based jerky may not include any components derived from animal muscle. In other words, the dairy-based jerky may be a meatless or vegetarian food product.

Dairy-based jerky formulations include proteins, fats, moisture, and other components. The protein content may be about 5 weight percent to about 30 weight percent of a dairy-based jerky, or about 5 weight percent to about 25 weight percent, about 5 weight percent to about 20 weight percent, about 5 weight percent to about 15 weight percent, about 10 weight percent to about 30 weight percent, about 15 weight percent to about 30 weight percent, about 20 weight percent to about 30 weight percent, or about 15 to about 20 weight percent of the dairy-based jerky.

The fat content the dairy-based jerky may be up to about 2.0 weight percent of the dairy-based jerky. The dairy-based jerky may not include fat (about 0 weight percent) or may include about 0.5 weight percent to about 2.0 weight percent of the dairy-based jerky, or about 0.5 weight percent to about 1.75 weight percent, about 0.5 weight percent to about 1.5 weight percent, about 0.5 weight percent to about 1.25 weight percent, about 0.5 weight percent to about 1.0 weight percent, about 0.75 weight percent to about 2.0 weight percent, about 1.0 weight percent to about 2.0 weight percent, about 1.25 weight percent to about 2.0 weight percent, about 1.5 weight percent to about 2.0 weight percent, about 1.75 weight percent to about 2.0 weight percent, about 1.5 weight percent to about 1.7 weight percent, or about 1.6 weight percent of the dairy-based jerky.

The moisture content of the dairy-based jerky may be about 5 weight percent to about 25 weight percent of the dairy-based jerky, or about 5 weight percent to about 20 weight percent, about 5 weight percent to about 15 weight percent, about 10 weight percent to about 25 weight percent, about 12 weight percent to about 18 weight percent, or about 10 weight percent to about 15 weight percent of the dairy-based jerky.

The compositions of the present disclosure differ from an approach disclosed in U.S. Pat. No. 6,815,000 (the '000 patent) in which non-meat protein isolate and starch are combined and extruded to form a jerky-like product. The non-meat protein isolate may be derived from canola, cottonseed, dairy, soy, sunflower, or wheat. The starch may be derived from corn, potato, rice, tapioca, or wheat. Compared to the '000 patent, the presently disclosed compositions do not include a protein isolate. The presently disclosed compositions do not include protein from any of canola, cottonseed, soy, sunflower, or wheat. The presently disclosed compositions may include a dry material blend including about 8 weight percent to about 12 weight percent starch, which is lower than the 15 weight percent to 45 weight percent starch in the '000 patent. The presently disclosed sources of starch does not include any of potato, rice, tapioca, or wheat, as in the '000 patent.

The presently disclosed meat substitutes include syrup solids in contrast to the '000 patent, which does not mention syrup solids. As described in more detail above, syrup solids may help impart a desired texture to the presently disclosed meat substitutes and may help maintain a desired texture for a longer period of time than in the absence of syrup solids.

In some embodiments, the presently disclosed compositions do not include flavoring agents as a component of the compositions (see e.g., FIGS. 1 and 2), which is in contrast to the 1 weight percent to 4 weight percent flavor compounds in the compositions of the '000 patent added prior to extrusion. A marination step may be used to impart flavor to the presently disclosed jerky products following formation of the meat substitute as described herein, of which step the '000 patent makes no mention. Comparisons of adding flavor compounds during the production of a meat substitute to marinating a produced meat substitute found that marinating greatly enhances flavor impact. The '000 patent includes a smoking step, which is not included in the presently disclosed methods of making jerky products, which methods are described in more detail below.

In the '000 patent, the compositions are heated twice, once by extrusion, which also shapes the pre-flavored compositions. In contrast, the presently disclosed methods of making meat substitutes and jerky products, described in detail below, do not include a step of extrusion.

The presently disclosed methods include a step of heating to about 300° F. to about 450° F. for about 15 minutes to about 40 minutes, during which the Maillard reaction occurs. The Maillard reaction may produce flavor compounds in the meat substitute and/or may promote non-enzymatic browning of the substitute, which may improve appearance of the meat substitute. For the Maillard reaction to occur, amino acids and reducing sugars, such as lactose, must be present. In the presently disclosed compositions, at least the dried milk products provide a source of lactose for the Maillard reaction. The syrup solids may also provide a source of sugar for the Maillard reaction. In contrast, the '000 patent employs protein isolates from which sugars have been removed, and the '000 does not employ syrup solids. Accordingly, if a whey protein isolate was used in the '000 patent, the Maillard reaction would not occur because the isolate does not provide the requisite sugar.

Methods of Making Meat Substitutes

Figure 2:
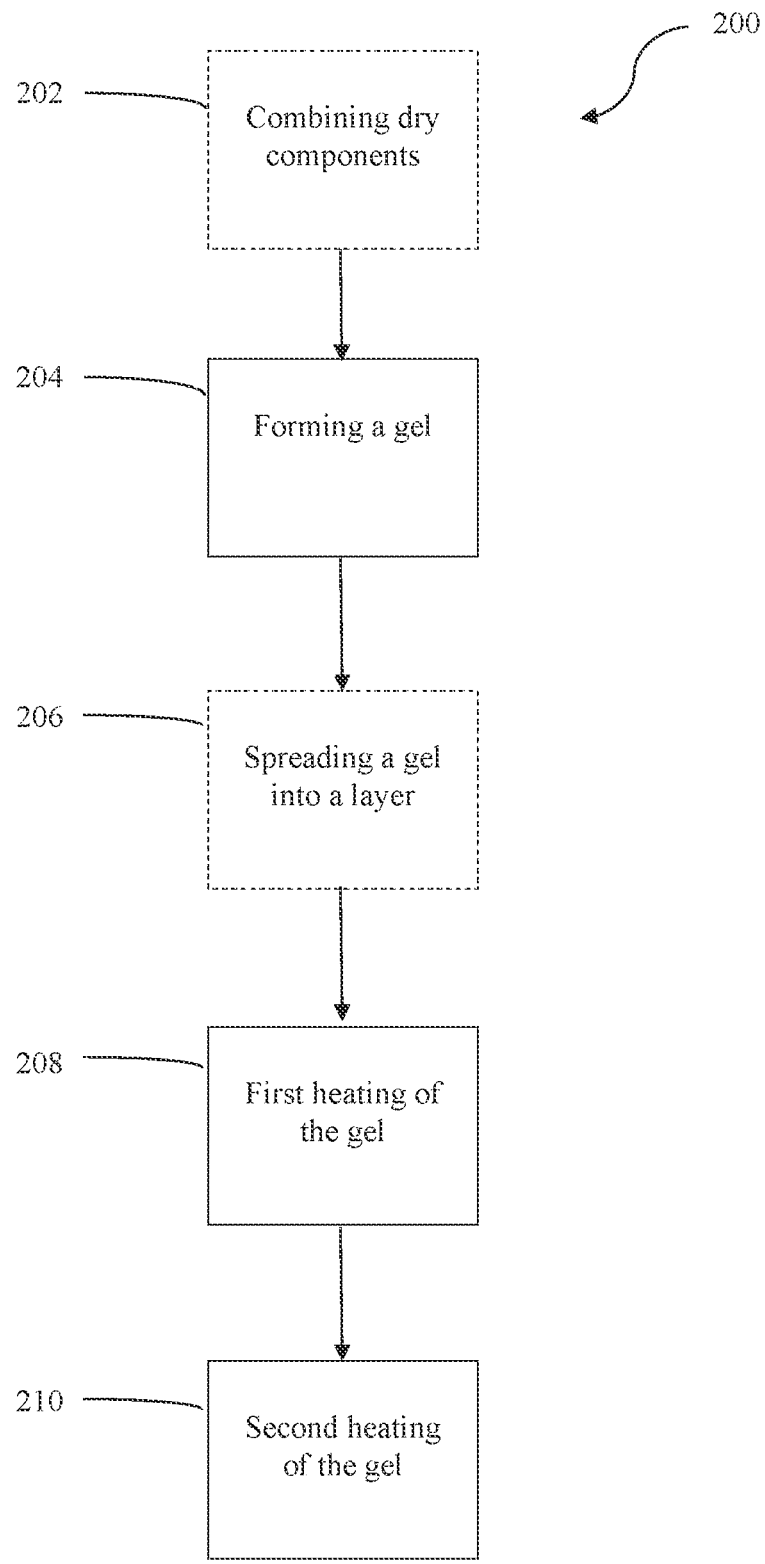
FIG. 2 is a flow diagram of a meat substitute preparation method according to another embodiment.

FIGS. 1 and 2 illustrate various methods of preparing the presently disclosed meat substitutes. Although illustrated separately, one or more of the steps of the methods of FIGS. 1 and 2 may be performed in combination.

With reference to FIG. 1, a method 100 of preparing a meat substitute includes a step 104 of blending dry components with a liquid; a step 106 of spreading a gel into a layer; a first heating step 108 of heating the gel; and a second heating step 110 of heating the gel. In some embodiments, the method 100 includes a step 102 of combining dry components. The method 100 may be a batch process.

In optional step 102, the dry components include one or more dried milk products and one or more carbohydrates, gelling agents, or texturizers. The dried milk products may include any one or more of non-fat dry milk, buttermilk powder, whey protein concentrate, milk protein concentrate, micellar casein concentrate, native whey protein concentrate, and native whey isolate. In one example, the dried milk products include either or both of non-fat dry milk and buttermilk powder. The carbohydrates may include either or both of a sugar, such as corn syrup solids, and a starch, such as corn starch.

The one or more dried milk products may be present at about 45 weight percent to about 70 weight percent of the total dry components, about 45 weight percent to about 65 weight percent, about 45 weight percent to about 60 weight percent, about 45 weight percent to about 55 weight percent, about 55 weight percent to about 70 weight percent, about 60 weight percent to about 70 weight percent, about 55 weight percent to about 60 weight percent, or about 57 weight percent of the total dry components.

The carbohydrates gelling agents, or texturizers may not be included (0 weight percent) or may be present at about 34 weight percent to about 54 weight percent of the total dry components, about 34 weight percent to about 50 weight percent, about 34 weight percent to about 46 weight percent, about 34 weight percent to about 42 weight percent, about 34 weight percent to about 38 weight percent, about 38 weight percent to about 54 weight percent, about 42 weight percent to about 54 weight percent, about 46 weight percent to about 54 weight percent, about 50 weight percent to about 54 weight percent, about 40 weight percent to about 45 weight percent, or about 43 weight percent of the total dry components.

In one example, the carbohydrates include syrup solids, such as corn syrup solids, and the syrup solids are present at about 26 weight percent to about 40 weight percent of the total dry components, about 26 weight percent to about 38 weight percent, about 26 weight percent to about 36 weight percent, about 26 weight percent to about 34 weight percent, about 26 weight percent to about 32 weight percent, about 26 weight percent to about 30 weight percent, about 28 weight percent to about 40 weight percent, about 30 weight percent to about 40 weight percent, about 32 weight percent to about 40 weight percent, about 34 weight percent to about 40 weight percent, about 36 weight percent to about 40 weight percent, about 32 weight percent to about 34 weight percent, or about 33 weight percent of the total dry components.

In one example, the carbohydrates include starch and the starch is present at about 8 weight percent to about 12 weight percent of the total dry components, about 8 weight percent to about 11 weight percent, about 8 weight percent to about 10 weight percent, about 9 weight percent to about 12 weight percent, about 10 weight percent to about 12 weight percent, about 9 weight percent to about 11 weight percent, or about 10 weight percent of the total dry components.

In step 104, the dry components may be blended with a liquid in a mixer or blender. The liquid may be any edible liquid such as water, milk, or filtered milk. The blending may be at slow enough speed and/or for a short enough time that the dried milk products do not foam. Without being limited to any mechanism or mode of action, the components may have a low enough concentration of protein and/or a high enough concentration of sugars that the mixture does not foam or does not stay foamy. The blending may be performed at about 6,000 rpm to about 16,000 rpm; about 6,000 rpm to about 12,000 rpm; about 6,000 rpm to about 10,000 rpm; about 6,000 rpm to about 16,000 rpm; about 8,000 rpm to about 16,000 rpm; about 10,000 rpm to about 16,000 rpm; about 12,000 rpm to about 16,000 rpm; about 14,000 rpm to about 16,000 rpm; about 7,000 rpm to about 13,000 rpm; or about 7,800 rpm to about 12,800 rpm.

The blending may be performed for about 15 seconds to about 75 seconds, about 15 seconds to about 65 seconds, about 15 seconds to about 55 seconds, about 15 seconds to about 45 seconds, about 15 seconds to about 35 seconds, about 15 seconds to about 25 seconds, about 25 seconds to about 75 seconds, about 35 seconds to about 75 seconds, about 45 seconds to about 75 seconds, about 55 seconds to about 75 seconds, about 65 seconds to about 75 seconds, or about 20 seconds to about 60 seconds. The blending may be performed at about room temperature.

Blending the dry components with a liquid may form a gel, which may be a semi-solid gel. The blended mix may be allowed to sit, which may help hydrate some or all of the dry ingredients and/or may help allow for the starch to help thicken the blended mix. The blended mix may be allowed to sit for about 4 minutes to about 60 minutes, about 4 minutes to about 50 minutes, about 4 minutes to about 40 minutes, about 4 minutes to about 30 minutes, about 4 minutes to about 20 minutes, about 10 minutes to about 60 minutes, about 20 minutes to about 60 minutes, about 30 minutes to about 60 minutes, about 40 minutes to about 60 minutes, about 20 minutes to about 40 minutes, or about 5 minutes to about 10 minutes.

In step 106, the gel is spread into a layer, such as by pouring it or pumping it onto a horizontal surface. Pumping the gel may provide further blending of the gel components. The horizontal surface may be a sheet, such as a heatable surface or baking sheet. The gel may be spread such that the layer has a thickness of about 1 mm to about 20 mm, about 1 mm to about 15 mm, about 1 mm to about 10 mm, about 1 mm to about 5 mm, about 5 mm to about 20 mm, about 10 mm to about 20 mm, about 5 mm to about 15 mm, or about 2 mm to about 8 mm.

With continued reference to FIG. 1, in step 108, the gel is heated, such as to form a solid gel. The gel may be heated in an oven. The gel may be heated such that some moisture is removed from the gel. The gel may be heated at a relatively low temperature to limit or avoid non-enzymatic browning, such as that produced by the Maillard reaction. The gel may be heated at about 210° F. to about 320° F., about 210° F. to about 300° F., about 210° F. to about 280° F., about 210° F. to about 260° F., about 210° F. to about 240° F., about 230° F. to about 320° F., about 250° F. to about 320° F., about 270° F. to about 320° F., about 290° F. to about 320° F., about 280° F. to about 290° F., or about 270° F. The gel may be heated for about 30 minutes to about 50 minutes, about 30 minutes to about 45 minutes, about 30 minutes to about 40 minutes, about 30 minutes to about 35 minutes, about 35 minutes to about 50 minutes, about 40 minutes to about 50 minutes, about 45 minutes to about 50 minutes, about 35 minutes to about 45 minutes, or about 40 minutes. In one example, the gel is heated at about 270° F. for about 40 minutes.

Step 110 is a second heating step having different temperature and/or different time conditions than the first heating step 108. In step 110, the gel may be heated such that some moisture is removed from the gel. The gel may be heated by, for example, baking it in an oven or frying it. Heating the gel may form a meat substitute.

The gel may be heated under conditions that promote a Maillard reaction. A Maillard reaction, as used herein, is a chemical reaction between an amino acid and a reducing sugar usually in the presence of heat. A Maillard reaction results in non-enzymatic browning of the gel or meat substitute. Because a reducing sugar is a reactant, a Maillard reaction will not occur in meat substitutes that do not include a sugar. For example, a Maillard reaction will not occur in dairy-based meat substitutes that include a whey isolate, which is nearly or completely lactose-free, without the addition of a sugar. Because an amino acid is a reactant, a Maillard reaction will not occur in meat substitutes that do not include amino acids or proteins. In this aspect, the Maillard reaction is different from caramelization, which involves oxidation of sugars and does not require amino acids. The Maillard reaction may result in the formation of a plurality of flavor compounds.

In step 110, the gel may be heated at about 300° F. to about 450° F., about 300° F. to about 425° F., about 300° F. to about 400° F., about 300° F. to about 375° F., about 300° F. to about 350° F., about 325° F. to about 450° F., about 350° F. to about 450° F., about 375° F. to about 450° F., about 400° F. to about 450° F., about 350° F. to about 400° F., or about 375° F. The gel may be heated for about 15 minutes to about 40 minutes, about 15 minutes to about 35 minutes, about 15 minutes to about 30 minutes, about 15 minutes to about 25 minutes, about 20 minutes to about 40 minutes, about 25 minutes to about 40 minutes, about 30 minutes to about 40 minutes, or about 20 minutes. In one example, the gel is heated at about 375° F. for about 20 minutes.

In some embodiments, the gel is heated (seared or fried) in a pan with a cooking oil or cooking spray. The gel may be fried at about 275° F. to about 450° F., about 275° F. to about 425° F., about 275° F. to about 400° F., about 275° F. to about 375° F., about 275° F. to about 350° F., about 300° F. to about 450° F., about 325° F. to about 450° F., about 350° F. to about 450° F., about 375° F. to about 450° F., about 400° F. to about 450° F., about 350° F. to about 390° F., or about 360° F. to about 380° F. The gel may be fried for about 3 minutes per side to about 7 minutes per side, or about 5 minutes per side. In one example, the gel is fried at about 360° F. to about 380° F. for about 5 minutes per side.

With reference to FIG. 2, a method 200 of preparing a meat substitute includes a step 204 of forming a gel; a first heating step 208 of heating the gel; and a second heating step 210 of heating the gel. In some embodiments, the method 200 includes a step 202 of combining dry components. In some embodiments, the method 200 includes a step 206 of spreading a gel into a layer. The method 200 may be a batch process.

Optional step 202 may be similar to optional step 102, described above. The dry components may include one or more dried milk products and one or more carbohydrates, gelling agents, or texturizers. The dried milk products may include any one or more of non-fat dry milk, buttermilk powder, whey protein concentrate, milk protein concentrate, micellar casein concentrate, native whey protein concentrate, and native whey isolate. In one example, the dried milk products include either or both of non-fat dry milk and buttermilk powder. The carbohydrates may include either or both of a sugar, such as corn syrup solids, and a starch, such as corn starch. The weight percentages of each dry component may be as described above for optional step 102.

In step 204, a gel is formed, which may be a semi-solid gel. The gel may be formed by blending dry components with a liquid. The dry components may include one or more dried milk products and one or more carbohydrates, gelling agents, or texturizers, as described for optional step 202. The blending may be performed in, for example, a mixer or blender. The blending may be at slow enough speed and/or for a short enough time that the dried milk products do not foam. Without being limited to any mechanism or mode of action, the components may have a low enough concentration of protein and/or a high enough concentration of sugars that the mixture does not foam or does not stay foamy. The blending may be performed as described above for step 104.

Optional step 206 may be similar to step 106 described above. In optional step 206, the gel is spread into a layer, such as by pouring it or pumping it onto a horizontal surface. Pumping the gel may provide further blending of the gel components. The horizontal surface may be a sheet, such as a heatable surface or baking sheet. The gel may be spread such that the layer has a thickness of about 1 mm to about 20 mm, about 1 mm to about 15 mm, about 1 mm to about 10 mm, about 1 mm to about 5 mm, about 5 mm to about 20 mm, about 10 mm to about 20 mm, about 5 mm to about 15 mm, or about 2 mm to about 8 mm.

First heating step 208 may be as described for first heating step 108 above. In step 208, the gel is heated, such as to form a solid gel. The gel may be heated such that some moisture is removed from the gel. The gel may be heated at a relatively low temperature to limit or avoid non-enzymatic browning, such as that produced by the Maillard reaction. The gel may be heated at about 210° F. to about 320° F., about 210° F. to about 300° F., about 210° F. to about 280° F., about 210° F. to about 260° F., about 210° F. to about 240° F., about 230° F. to about 320° F., about 250° F. to about 320° F., about 270° F. to about 320° F., about 290° F. to about 320° F., about 280° F. to about 290° F., or about 270° F. The gel may be heated for about 30 minutes to about 50 minutes, about 30 minutes to about 45 minutes, about 30 minutes to about 40 minutes, about 30 minutes to about 35 minutes, about 35 minutes to about 50 minutes, about 40 minutes to about 50 minutes, about 45 minutes to about 50 minutes, about 35 minutes to about 45 minutes, or about 40 minutes. In one example, the gel is heated at about 270° F. for about 40 minutes.

Second heating step 210 may be similar to second heating step 110 described above. The temperature and/or time conditions may be different than those of the first heating step 208. In step 210, the gel may be heated such that some moisture is removed from the gel. Heating the gel may form a meat substitute. The gel may be heated under conditions that promote a Maillard reaction.

In step 210, the gel may be heated at about 300° F. to about 450° F., about 300° F. to about 425° F., about 300° F. to about 400° F., about 300° F. to about 375° F., about 300° F. to about 350° F., about 325° F. to about 450° F., about 350° F. to about 450° F., about 375° F. to about 450° F., about 400° F. to about 450° F., about 350° F. to about 400° F., or about 375° F. The gel may be heated for about 15 minutes to about 40 minutes, about 15 minutes to about 35 minutes, about 15 minutes to about 30 minutes, about 15 minutes to about 25 minutes, about 20 minutes to about 40 minutes, about 25 minutes to about 40 minutes, about 30 minutes to about 40 minutes, or about 20 minutes.

In one example, the gel is heated at about 375° F. for about 20 minutes.

Methods 100, 200 of preparing a meat substitute may exclude one or more steps of known preparation methods. For example, the methods 100, 200 may not include a step of extruding the gel. The methods 100, 200 may not include a step of smoking the gel.

Figure 3:
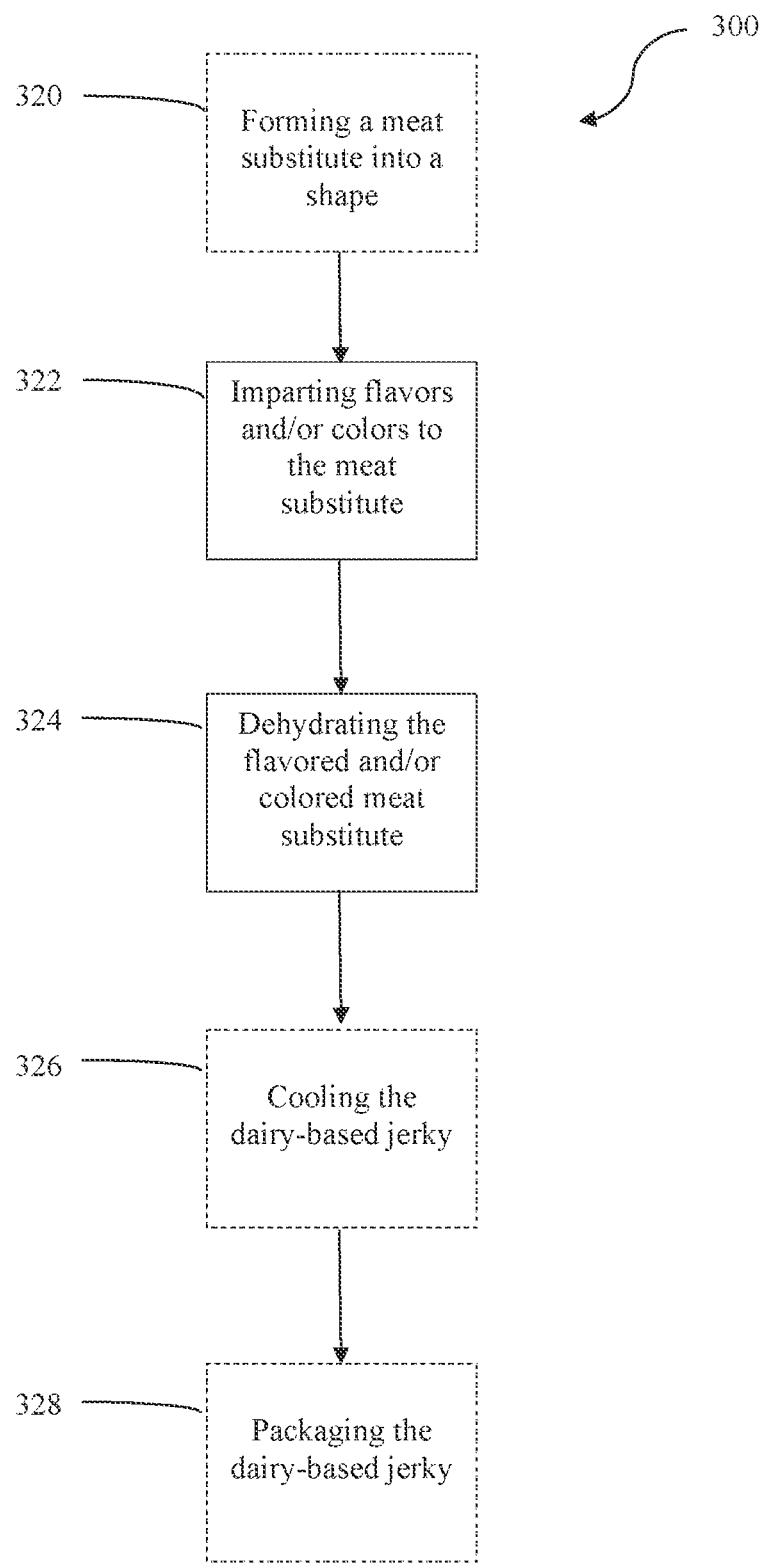
FIG. 3 is a flow diagram of a dairy-based jerky preparation method according to one embodiment.

FIG. 3 illustrates a method of preparing a dairy-based jerky food product that includes a meat substitute. A method 300 of preparing a dairy-based jerky includes a step 322 of imparting desired flavors and/or colors the meat substitute; and a step 324 of dehydrating the flavored and/or colored meat substitute. In some embodiments, the method 300 includes one or more of a step 320 of forming a meat substitute into a desired shape; a step 326 of cooling the dairy-based jerky; and a step 328 of packaging the dairy-based jerky. The method 300 may be a batch process.

The meat substitute used in the method 300 of preparing a dairy-based jerky may be any meat substitute prepared by the methods 100, 200 of preparing a meat substitute.

In optional step 320, the meat substitute is formed, such as by cutting, into a desired shape, such as strips or rectangles. Including step 320 in method 300 may help produce a dairy-based jerky with a shape similar to meat jerky. Performing step 320 increases the surface area to volume ratio of the meat substitute, which may expose a greater surface area to flavors/colors in step 322, which in turn may increase the absorbance of the flavors and/or colors into the meat substitute.

In step 322, desired flavors and/or colors are imparted to the meat substitute by, for example, marinating the meat substitute in a marinade, dipping the meat substitute in a marinade, or glazing the meat substitute with a marinade or glaze. The meat substitute may be marinated, dipped, or glazed until the flavors of the marinade have set in the meat substitute. The meat substitute may be marinated at a temperature that helps maintain food safety. The meat substitute may be marinated at about 30° F. to about 50° F., about 30° F. to about 45° F., about 30° F. to about 40° F., about 30° F. to about 35° F., about 35° F. to about 50° F., about 40° F. to about 50° F., about 45° F. to about 50° F., about 35° F. to about 45° F., or about 40° F.

The meat substitute may be marinated for about 1 hour to about 24 hours, about 1 hour to about 22 hours, about 1 hour to about 20 hours, about 1 hour to about 18 hours, about 1 hour to about 16 hours, about 1 hour to about 14 hours, about 1 hour to about 12 hours, about 1 hour to about 10 hours, about 1 hour to about 8 hours, about 1 hours to about 6 hours, about 2 hours to about 24 hours, about 4 hours to about 24 hours, about 6 hours to about 24 hours, about 8 hours to about 24 hours, about 10 hours to about 24 hours, about 12 hours to about 24 hours, about 14 hours to about 24 hours, about 16 hours to about 24 hours, about 18 hours to about 24 hours, about 20 hours to about 24 hours, about 5 hours to about 20 hours, about 10 hours to about 15 hours, or about 3 hours to about 5 hours. In one example, the meat substitute is marinated at about 40° F. for about 4 hours.

The meat substitute may be dipped or glazed for less than 30 minutes, such as about 1 minute to about 30 minutes, about 1 minute to about 20 minutes, about 1 minute to about 10 minutes, about 5 minutes to about 30 minutes, about 10 minutes to about 30 minutes, about 20 minutes to about 30 minutes, less than about 5 minutes, or less than about 1 minute.

With continued reference to FIG. 3, in step 324, the flavored and/or colored meat substitute is dehydrated, such as to form a dairy-based jerky. The meat substitute may be dehydrated by, for example, heating the meat substitute in an oven or placing the meat substitute in a dehydrator. The meat substitute may be dehydrated such that the resulting dairy-based jerky has a moisture content of about 8 weight percent to about 24 weight percent, about 8 weight percent to about 20 weight percent, about 8 weight percent to about 16 weight percent, about 8 weight percent to about 12 weight percent, about 12 weight percent to about 24 weight percent, about 16 weight percent to about 24 weight percent, about 20 weight percent to about 24 weight percent, about 10 weight percent to about 20 weight percent, about 14 weight percent to about 16 weight percent, or about 15 weight percent of the dairy-based jerky.

The flavored and/or colored meat substitute may be heated at about 140° F. to about 220° F., about 140° F. to about 200° F., about 140° F. to about 180° F., about 140° F. to about 160° F., about 160° F. to about 220° F., about 180° F. to about 220° F., about 200° F. to about 220° F., about 190° F. to about 210° F., or about 180° F. The meat substitute may be heated for about 3 hours to about 12 hours, about 3 hours to about 10 hours, about 3 hours to about 9 hours, about 3 hours to about 8 hours, about 3 hours to about 7 hours, about 3 hours to about 6 hours, about 4 hours to about 12 hours, about 5 hours to about 12 hours, about 6 hours to about 12 hours, about 7 hours to about 12 hours, about 8 hours to about 12 hours, about 4 hours to about 9 hours, about 5 hours to about 7 hours, or about 6 hours. In one example, the meat substitute is heated at about 180° F. for about 6 hours.

In optional step 326, the dairy-based jerky is cooled to room temperature. The dairy-based jerky may be passively cooled or actively cooled, such as by refrigerating the dairy-based jerky.

In optional step 328, the dairy-based jerky is packaged. The packaging may be any desired packaging for individual pieces of the dairy-based jerky or multiple pieces.

Although the method 300 of preparing a dairy-based jerky is illustrated separately from methods 100, 200 of preparing a meat substitute, any one or more of the steps of the method 300 may be incorporated into methods 100, 200 of preparing a meat substitute. For example, methods 100, 200 of preparing a meat substitute may include a step of marinating the meat substitute similar to step 322. As another example, methods 100, 200 of preparing a meat substitute may include a step of dehydrating the meat substitute similar to step 324.

EXAMPLE

The following example illustrates various aspects of the disclosure and should not be considered limiting.

Example 1—Textures of Dairy-Based Jerkies

Meat substitutes prepared by the methods 100, 200 disclosed herein were used to prepare dairy-based jerky samples according to method 300.

Dairy-based jerky prepared using a meat substitute prepared by spreading a gel comprising non-fat dry milk, buttermilk powder, corn syrup solids, and water into a layer had a chewy texture. Decreasing the thickness of the layer produced dairy-based jerky having a tougher texture. In one comparison, a layer thickness of 5 mm produced a dairy-based jerky having a chewier texture than that of a dairy-based jerky produced from a 2-mm layer, which had a tougher texture.

Dehydrated dairy-based jerky samples had a chewy texture. Increasing the dehydration time produced dairy-based jerky samples having a firmer texture. In one comparison, a jerky that had been dehydrated for 5 hours had a chewy texture and a jerky that had been dehydrated for 7 hours had a firm texture. In another comparison, dairy-based jerky was dehydrated until the desired texture (e.g., chewy, firm, crispy) was reached.

These results demonstrate that the texture of food products that include meat substitutes can be changed by adjusting the processing conditions.

Although the present disclosure provides references to preferred embodiments, persons skilled in the art will recognize that changes may be made in form and detail without departing from the spirit and scope of the invention.

What is claimed is:

1. A method of producing a meat substitute, the method comprising:
    blending water with a mixture of dry components to form a gel, the dry components including at least one dried milk product comprising lactose and protein and at least one carbohydrate;
    heating the gel in a first heating step, wherein the gel is heated at about 210° F. to about 320° F. for about 30 minutes to about 50 minutes; and
    after the first heating step, heating the gel in a second heating step having a different temperature than the first heating step, wherein the lactose and protein in the at least one dried milk product undergo a Maillard reaction in the second heating step to form the meat substitute,
    wherein the at least one dried milk product includes non-fat dry milk present at about 38 weight percent to about 43 weight percent of the meat substitute and includes buttermilk powder present at about 7 weight percent to about 12 weight percent of the meat substitute; and
    wherein the at least one carbohydrate includes corn syrup solids having a dextrose equivalent of about 25 to about 55, and the at least one carbohydrate is included at about 26 weight percent to about 70 weight percent of the meat substitute.

2. The method of claim 1, wherein the blending is performed at about 6,000 rpm to about 16,000 rpm for about 15 seconds to about 75 seconds.

3. The method of claim 1, wherein the Maillard reaction occurs by heating the gel to a temperature of about 300° F. to about 450° F. for about 15 minutes to about 25 minutes.

4. The method of claim 1, wherein the Maillard reaction occurs by frying the gel at a temperature of about 275° F. to about 450° F. for about 3 minutes to about 7 minutes.

5. The method of claim 1, wherein the at least one carbohydrate further includes corn starch.

6. The method of claim 5, wherein the corn starch is present at about 8 weight percent to about 12 weight percent of the dry components.

7. The method of claim 1, wherein the corn syrup solids have a dextrose equivalent of about 42 to about 55 and are present at about 26 weight percent to about 40 weight percent of the dry components.

8. The method of claim 7, wherein the meat substitute has a chewy texture.

9. The method of claim 1, wherein the corn syrup solids have a dextrose equivalent of about 26 to about 30 and the meat substitute has a crisp texture.

10. The method of claim 1, wherein the buttermilk powder is present at about 9 weight percent to about 10 weight percent of the meat substitute.

11. The method of claim 1, wherein the gel is free of a protein isolate.

12. The method of claim 1, further comprising, prior to the first heating step, hydrating and thickening the gel by letting the gel stand for about 4 minutes to about 60 minutes.

13. The method of claim 1, further comprising, prior to the first heating step, forming the gel in a layer having a thickness of about 1 mm to about 10 mm.

14. The method of claim 1, further comprising:
marinating the meat substitute, and
removing moisture from the marinated meat substitute to about 12 weight percent to about 18 weight percent moisture.

15. The method of claim 14, wherein the moisture is removed from the marinated meat substitute by a third heating step comprising heating the marinated meat substitute at about 140° F. to about 220° F. for about 4.75 hours to about 7.25 hours.

* * * * *